No. 644,372. Patented Feb. 27, 1900.
P. T. SIEVERT.
APPARATUS FOR MANUFACTURING GLASS ARTICLES.
(Application filed Dec. 8, 1899.)

(No Model.) 4 Sheets—Sheet 1.

Witnesses:
Edward Vieser
George Barry Jr.

Inventor:
Paul Theodor Sievert
By attorneys
Brown & Seward

No. 644,372. Patented Feb. 27, 1900.
P. T. SIEVERT.
APPARATUS FOR MANUFACTURING GLASS ARTICLES.
(Application filed Dec. 8, 1899.)
(No Model.) 4 Sheets—Sheet 2.

No. 644,372. Patented Feb. 27, 1900.
P. T. SIEVERT.
APPARATUS FOR MANUFACTURING GLASS ARTICLES.
(Application filed Dec. 8, 1899.)

(No Model.) 4 Sheets—Sheet 3.

Witnesses:
Edward Kieser
George Barry Jr.

Inventor:
Paul Theodor Sievert
by attorneys
Ronnt & Seward

No. 644,372. Patented Feb. 27, 1900.
P. T. SIEVERT.
APPARATUS FOR MANUFACTURING GLASS ARTICLES.
(Application filed Dec. 8, 1899.)
(No Model.) 4 Sheets—Sheet 4.

UNITED STATES PATENT OFFICE.

PAUL THEODOR SIEVERT, OF DRESDEN, GERMANY.

APPARATUS FOR MANUFACTURING GLASS ARTICLES.

SPECIFICATION forming part of Letters Patent No. 644,372, dated February 27, 1900.

Application filed December 8, 1899. Serial No. 739,641. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for the Manufacture of Glass Articles, of which the following is a specification.

In my United States Patent No. 637,899, of November 28, 1899, for improvement in manufacture of glass articles I have described a process for producing hollow glass bodies from a flat layer of hot plastic glass, in which process the edges of said layer were clamped and one side of the so-clamped layer was subjected to the pressure of steam generated by the heat of the glass, and in my said United States Patent I have described that process as above stated and also regulating the action of said steam during the formation of the hollow glass body or bodies by more or less pressure on the edges of the hot layer of glass. In my said United States Patent I have stated that the pressure of steam may be generated in a most suitable manner by a moist porous mat which is put upon a suitable support and upon which mat the flat plastic glass layer is put.

Now my present invention relates to an apparatus for carrying the above-specified process into effect, and I will describe the same and its mode of working with reference to the annexed drawings.

Figure 1:
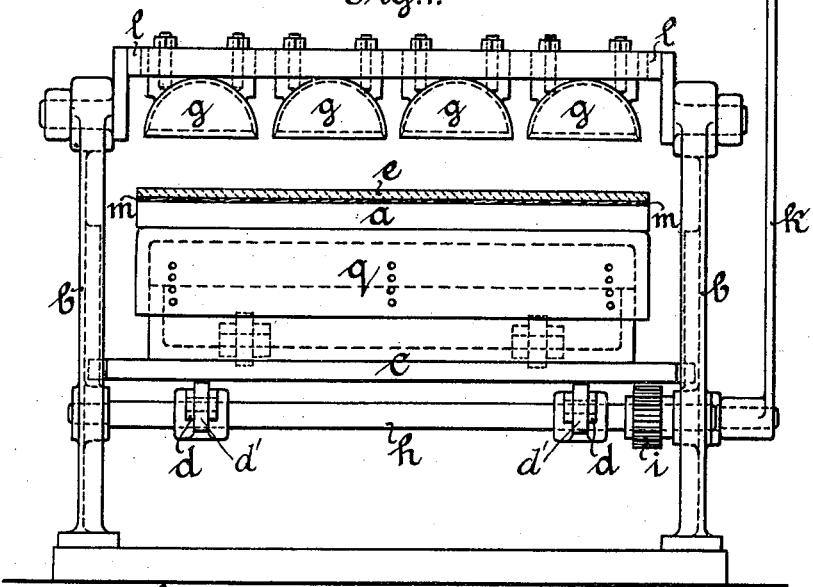
Figure 2:
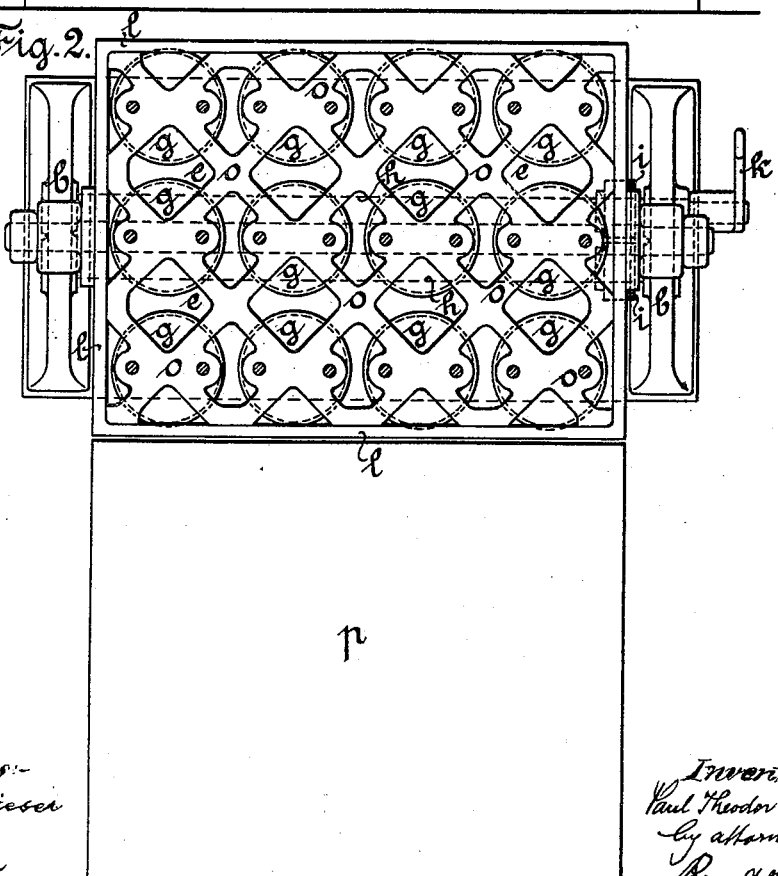
Figure 3:
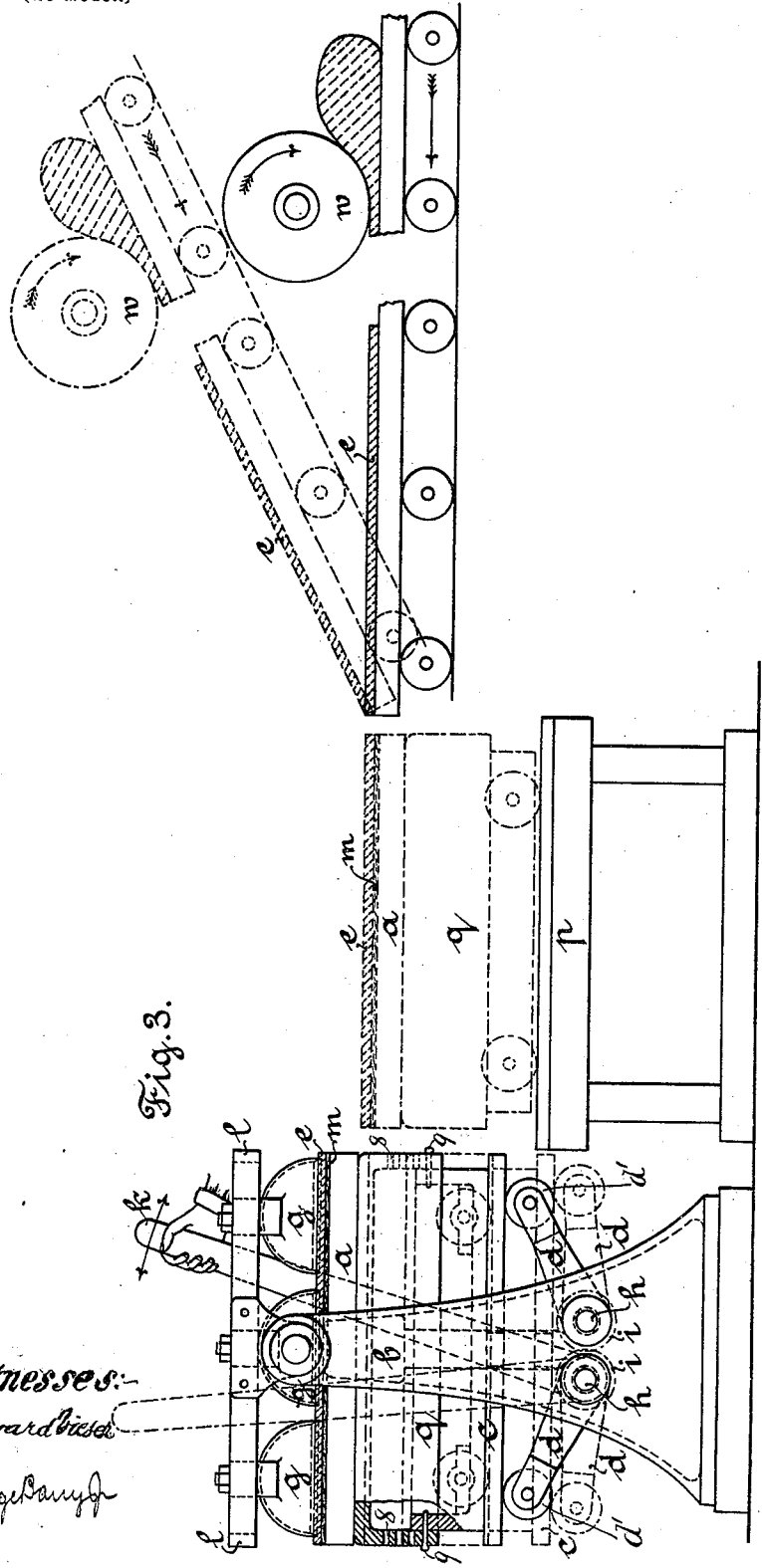
Figure 4:
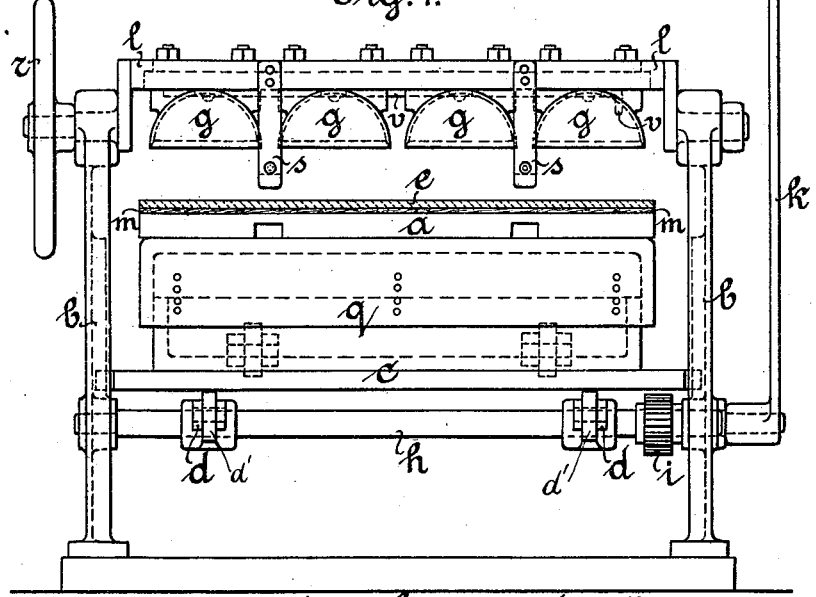
Figure 5:
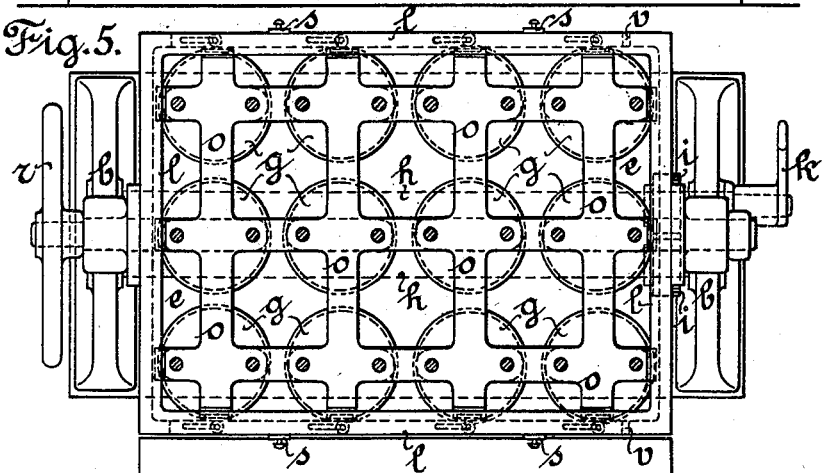
Figure 6:
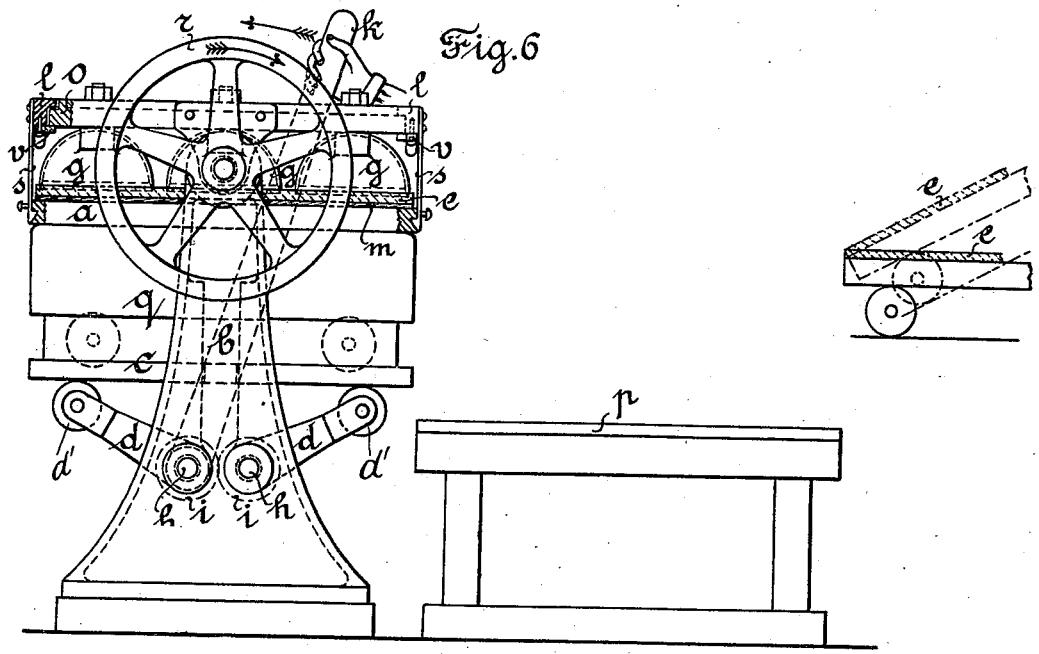
Figure 7:
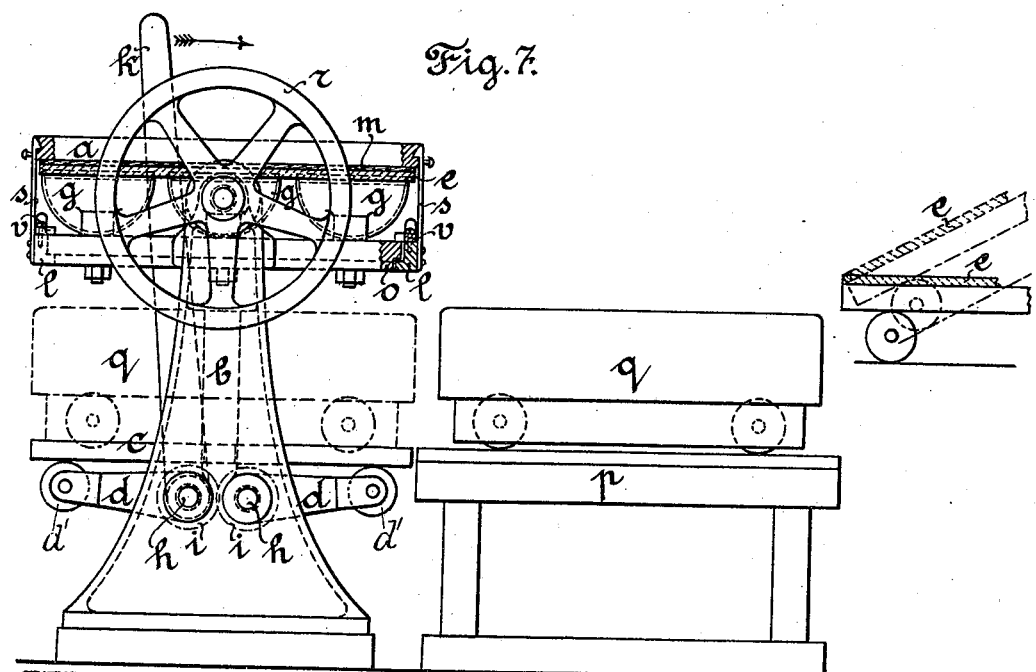

Figure 1 is an end view, Fig. 2 is a plan, and Fig. 3 is a side view, partly in section, of the apparatus with a fixed head of molds for manufacturing hollow glass bodies. Fig. 4 is an end view, Fig. 5 is a plan, and Fig. 6 is a side view, of the apparatus with a reversible head of molds; and Fig. 7 is a side view, same as Fig. 6, with the head of molds in a reversed position.

Between the uprights $b\ b$ in Fig. 1 a carrying-plate $c$ is arranged, which by means of projections is suitably guided in said uprights in its up-and-down motion. The plate $c$ is carried at its lower surface by means of rollers $d'$, which form the ends of the rocking levers $d\ d$. These levers are keyed upon the shafts $h\ h$, which are carried in bearings in the uprights $b\ b$. The two shafts are connected by the two pinions $i\ i$. At the one end of one of the shafts $h$ a hand-lever $k$ is mounted, by the rocking of which the shafts $h\ h$ are simultaneously rocked, so that the two levers $d\ d$ are moved either to raise or to lower the carrying-plate $c$ according to will. At the upper ends of the uprights $b\ b$ a frame $l$ is fixed, surrounding and holding a lattice or grate $o$, to the under side of which hollow molds $g$ are attached, which may be fastened in a manner to be easily exchanged for other molds.

At the one end of the apparatus a table $p$ is arranged, as shown in Figs. 2 and 3, upon which the carriage $q$ is placed. The upper part of this carriage is made adjustable higher or lower with relation to the lower part by being fitted thereto as a cap, as shown in Fig. 3, and by providing in both parts opposite vertical series of holes 8 8 to receive pins 9 9, which, inserted through corresponding holes in the upper and lower parts, support the upper part at its adjusted height. The upper surface of the said carriage carries the plate $a$, and upon this plate a moist mat $m$ is placed, which may be made of textile material made incombustible or of asbestos and which is moistened for generating steam by the contact with the hot glass layer $e$. This hot glass layer $e$ may either be spread out on the moist mat $m$ or it may be drawn over from a separate level or incline, on which it has been spread out by a roller $w$, onto the moist mat. In either case the carriage $q$, with the moist mat and the hot glass layer, is quickly removed into the apparatus and onto the carrying-plate $c$, which position is indicated in Fig. 1. The hand-lever $k$ is then rocked into the position shown in Fig. 3 in full lines, whereby the carrying-plate $c$, with the loaded carriage, is raised to such an extent that the fixed molds $g$, with their lower rim, have entered into the hot glass layer $e$, so as to form a tight closure therewith. This position is shown in full lines, Fig. 3. In consequence of this tight closure the steam generated will expand the glass layer into the molds $g$. The operator now is capable, by working the hand-lever, to press the glass layer more or less against the lower rim of the molds in order to regulate thereby the required pressure for expanding the glass layer to form the hollow glass bodies. After these bodies have been formed in the molds the plate c, with the carriage q and the hollow glass bodies on it, is lowered down, the carriage q is removed from the apparatus upon the table p in order to have the hollow glass bodies removed from it, and afterward the mat, if necessary, is moistened again, a fresh layer of hot glass is brought onto it, and the above-described process is repeated. Instead of said molds g shape-giving frames only may be suitably fixed to the lattice o, within which shape-giving frames, which keep the glass down at the proper lines, the glass layer expands by the steam-pressure generated. The expanding of the glass in this case takes place into the free air instead of into closed molds.

With reference to Figs. 1, 2, and 3 the process of manufacturing hollow glass bodies has been described by expanding the hot plastic glass layer into the upward direction. Now in order to expand the hot plastic glass layer into a downward direction, which mode of working may be preferable in some cases, the apparatus for this purpose is modified in the following manner, which is illustrated in Figs. 4 to 7: The identical parts in these figures are indicated with the same letters as those in Figs. 1, 2, and 3. In the modified apparatus the frame l, with the lattice o and the molds g, is made reversible or invertible by providing said frame with trunnions carried in bearings of the uprights b. One of the trunnions is provided with a handle or a hand-wheel r. The frame l is provided with a number of spring-latches s. The plate a is provided with a number of notches corresponding to the noses of the said latches s. Furthermore, the lattice o is arranged loosely in frame l in order to allow the lattice to be slightly movable in its place in regulating the pressure by the rocking lever. The bolts v will serve for fixing the lattice within the frame for the position of same, (indicated in Fig. 6.) The mode of working with this modified apparatus is the following: After the frame l, with its molds g, has been placed so that the opening or the rim of said molds is turned in downward direction (see Fig. 4) the carriage q, with the plate a, the moist mat m, and the hot plastic layer of glass e on it, is placed on the carrying-plate c, Fig. 4, and the latter raised into the position Fig. 6. Thus the rims of the molds g enter sufficiently into the glass layer, while the noses of the latches s take into the notches of the plate a, thereby automatically combining the plate a, the moist mat, and the glass layer with the frame l. Then the carrying-plate c, with the carriage q on it, is lowered down by rocking the hand-lever k, and the carriage q is removed out of the apparatus upon the table p. (See Fig. 7.) Now the parts—frame l, lattice o, molds g, plate a, with moist mat m, and glass layer e—held together by the latches are quickly turned over by means of the wheel r. The carriage q is moved into the apparatus and raised sufficiently, so as to exert the necessary pressure against the glass layer, the pressure in this instant being regulated again, as above stated. In this part of the operation the frame l and the lattice and molds are automatically disconnected temporarily from the plate a by the latches slipping out of their notches in the said plate. After the glass having been completely expanded into the molds the carriage q is lowered and removed to the table p. The parts combined by the latches are again reversed into the position Fig. 6, so that plate a becomes the lowest. The carriage q is again introduced into the apparatus, raised, so as to support the plate a, with its load, after the latches have been relieved, and when it is lowered again to be removed from the apparatus in order to have removed from it the ready-blown hollow glass bodies.

In the above description of the apparatus and its mode of working with reference to Figs. 1 to 7 I have not specified the construction of plate a, upon which the moist mat m and the layer of glass e are placed. Said plate a may be a solid one, as shown in Fig. 1 in my United States Patent No. 637,899; but in some cases I may make use of a hollow plate with suitable perforation or perforations, as indicated in Fig. 2 of said patent. This latter construction I prefer in cases in which hollow glass bodies of some considerable height shall be produced for admitting an elastic pressure medium into said plate, which admitted medium has the duty to assist the action of the steam-pressure generated by the contact of the hot glass with the moist mat for completing the expansion of the glass to form the hollow bodies.

I claim—

1. In an apparatus for the manufacture of hollow glass bodies by causing steam-pressure to be exerted against a layer of hot plastic glass, the combination of a plate a and a porous mat m thereon for supporting said layer, a carrying-plate c for supporting said plate a, means for raising and lowering the said carrying-plate c, a frame l and a lattice o contained therein arranged at a distance above said plate a, and a mold or molds g carried by said lattice, substantially as herein described.

2. In an apparatus for the manufacture of hollow glass bodies by causing steam-pressure to be exerted against a layer of hot plastic glass, the combination of a plate a and a porous mat m thereon for supporting said layer, a carriage q for supporting said plate a, a carrying-plate c for supporting said carriage, means for raising and lowering said carrying-plate c and carriage q, and a frame l with an attached mold or series of molds g arranged at a distance above said plate a, substantially as herein described.

3. In an apparatus for the manufacture of hollow glass bodies by causing steam-pressure to be exerted against a layer of hot plastic glass, the combination of a plate $a$ and a porous mat $m$ thereon for supporting said layer, an adjustable carriage $q$ for supporting said plate $a$, a carrying-plate $c$ for supporting said carriage, means for raising and lowering said carrying-plate $c$ and carriage $q$, means for vertically adjusting the upper part of said carriage, and a frame $l$ with an attached mold or series of molds arranged at a distance above said plate $a$, substantially as herein described.

4. In an apparatus for the manufacture of hollow glass bodies by causing steam-pressure to be exerted against a flat layer of hot plastic glass, the combination of a plate $a$ and a mat $m$ thereon for supporting said layer, an invertible frame $l$ and lattice-work $o$ therein, molds $g$ attached to said lattice, means for raising the said plate $a$, and means for detachably uniting said plate $a$ to said frame $l$ to simultaneously reverse the position of parts thus united, substantially as herein described.

5. In an apparatus for manufacturing hollow glass bodies by causing steam-pressure to be exerted against a flat layer of hot plastic glass, the combination of a plate $a$ and a porous mat $m$ thereon for supporting said layer, a frame $l$ and lattice $o$ and a mold or molds $g$ carried thereby, and automatically-disconnecting fastenings between said frame and said plate, substantially as herein described.

In testimony that I claim the foregoing as my invention I have signed my name, in presence of two witnesses, this 20th day of November, 1899.

PAUL THEODOR SIEVERT.

Witnesses:
 HERNANDO DE SOTO,
 PAUL ARRAS.